United States Patent
Kahle

(10) Patent No.: US 7,200,689 B2
(45) Date of Patent: Apr. 3, 2007

(54) CACHEABLE DMA

(75) Inventor: James Allan Kahle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 10/631,590

(22) Filed: Jul. 31, 2003

(65) Prior Publication Data

US 2005/0027899 A1    Feb. 3, 2005

(51) Int. Cl.
*G06F 13/28* (2006.01)
(52) U.S. Cl. .......................... 710/22; 710/23; 710/24; 710/29
(58) Field of Classification Search ................ None
See application file for complete search history.

(56) References Cited

U.S. PATENT DOCUMENTS

| | | | |
|---|---|---|---|
| 5,822,616 A | | 10/1998 | Hirooka |
| 5,890,271 A | * | 4/1999 | Bromley et al. ............... 29/263 |
| 5,893,165 A | * | 4/1999 | Ebrahim ...................... 711/158 |
| 5,953,538 A | | 9/1999 | Duncan et al. |
| 6,178,533 B1 | * | 1/2001 | Chang ........................ 714/739 |
| 6,182,111 B1 | | 1/2001 | Inohara et al. |
| 6,205,409 B1 | | 3/2001 | Zvonar |
| 6,247,094 B1 | * | 6/2001 | Kumar et al. .................. 711/3 |
| 6,401,193 B1 | | 6/2002 | Afsar et al. |
| 6,427,201 B1 | | 7/2002 | Ohba |
| 6,636,906 B1 | * | 10/2003 | Sharma et al. ................ 710/22 |
| 6,658,537 B2 | | 12/2003 | Hughes et al. |
| 6,681,296 B2 | | 1/2004 | Liao et al. |
| 6,693,846 B2 | | 2/2004 | Fibranz |
| 6,697,916 B2 | | 2/2004 | Lasserre et al. |
| 6,711,650 B1 | | 3/2004 | Bohrer et al. |
| 6,738,881 B1 | | 5/2004 | Ollivier et al. |
| 6,842,822 B2 | | 1/2005 | Snyder et al. |
| 6,874,039 B2 | * | 3/2005 | Ganapathy et al. ........... 710/28 |
| 7,010,626 B2 | | 3/2006 | Kahle |
| 2001/0003838 A1 | * | 6/2001 | Hornung et al. ............ 711/119 |
| 2003/0154349 A1 | | 8/2003 | Berg et al. |
| 2004/0193754 A1 | | 9/2004 | Kahle |
| 2005/0027899 A1 | | 2/2005 | Kahle |
| 2005/0033874 A1 | | 2/2005 | Futral et al. |
| 2005/0210204 A1 | * | 9/2005 | Yamazaki .................... 711/145 |
| 2005/0216610 A1 | | 9/2005 | Johns et al. |

* cited by examiner

*Primary Examiner*—Fritz Fleming
*Assistant Examiner*—Niketa I. Patel
(74) *Attorney, Agent, or Firm*—Stephen J. Walder, Jr.; Stephen R. Tkacs; Diana R. Gerhardt

(57) ABSTRACT

A method and an apparatus are provided for loading data to a local store of a processor in a computer system having a direct memory access (DMA) mechanism. A transfer of data is performed from a system memory of the computer system to the local store. The data is fetched from the system memory to a cache of the processor. A DMA load request is issued to request data. It is determined whether the requested data is found in the cache. Upon a determination that the requested data is found in the cache, the requested data is loaded directly from the cache to the local store.

8 Claims, 3 Drawing Sheets

CACHEABLE DMA

BACKGROUND OF THE INVENTION

1. Field of the Invention

The invention relates generally to memory management and, more particularly, to fetching data to a cache in a direct memory access (DMA) mechanism.

2. Description of the Related Art

In a multiprocessor design, a DMA mechanism is used to move information from one type of memory to another. The DMA mechanism such as a DMA engine or DMA controller also moves information from a system memory to a local store of a processor. When a DMA command tries to move information from the system memory to the local store of the processor, there is going to be some delay in loading the information from the system memory to the local store of the processor.

Therefore, a need exists for a system and method for fetching data from a system memory to a cache for a direct memory access (DMA) mechanism in a computer system.

SUMMARY OF THE INVENTION

The present invention provides a method and an apparatus for loading data to a local store of a processor in a computer system having a direct memory access (DMA) mechanism. A transfer of data is performed from a system memory of the computer system to the local store. The data is fetched from the system memory to a cache of the processor. A DMA load request is issued to request data. It is determined whether the requested data is found in the cache. Upon a determination that the requested data is found in the cache, the requested data is loaded directly from the cache to the local store.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless indicated otherwise.

Figure 1:
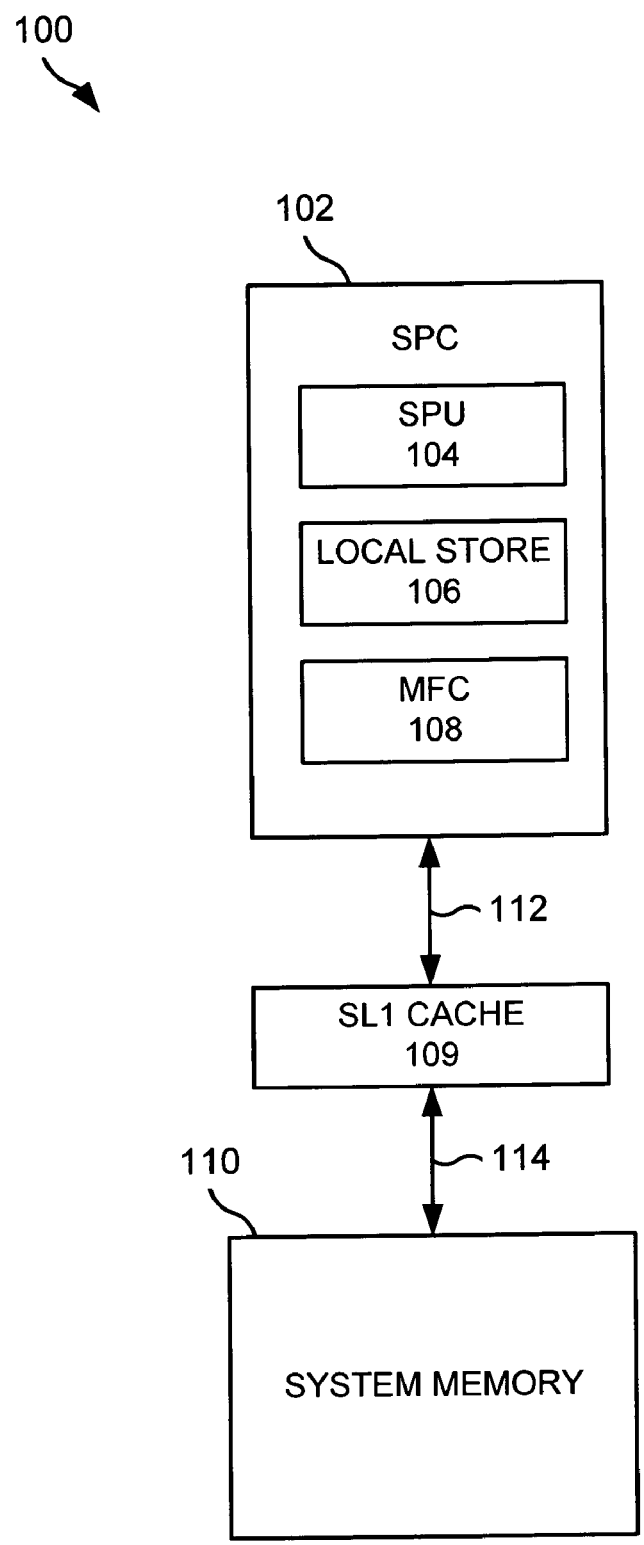
FIG. 1 shows a block diagram illustrating a single processor computer system adopting a cache along with a direct memory access (DMA) mechanism.

Referring to FIG. 1 of the drawings, the reference numeral 100 generally designates a single processor computer system adopting a cache in a direct memory access (DMA) mechanism. The single processor computer system 100 comprises a synergistic processor complex (SPC) 102, which includes a synergistic processor unit (SPU) 104, a local store 106, and a memory flow controller (MFC) 108. The single processor computer system also includes an SPU's L1 cache (SL1 cache) 109 and a system memory 110. The SPC 102 is coupled to the SL1 cache 109 via a connection 112. The SL1 cache 109 is coupled to the system memory 110 via a connection 114. The MFC 108 functions as a DMA controller.

Once the MFC 108 performs data transfers between the system memory 110 and the local store 106, the transferred data is also fetched to the SL1 cache 109. When the MFC 108 requests the same data later on, the MFC 108 does not have to go all the way back to the system memory 110 to retrieve the data. Instead, the MFC 108 accesses the SL1 cache 109 to retrieve the data and transfer the data to the local store 106. Typically, the size of data being transferred should not exceed the size of the SL1 cache 109.

Preferably, the MFC 108 checks the SL1 cache 109 first for any data. If there is a hit, the MFC 108 transfers the data from the SL1 cache 109 to the local store 106. If there is a miss, the MFC 108 transfers the data from the system memory 110 to the local store 106 as the MFC 108 would normally do.

Figure 2:
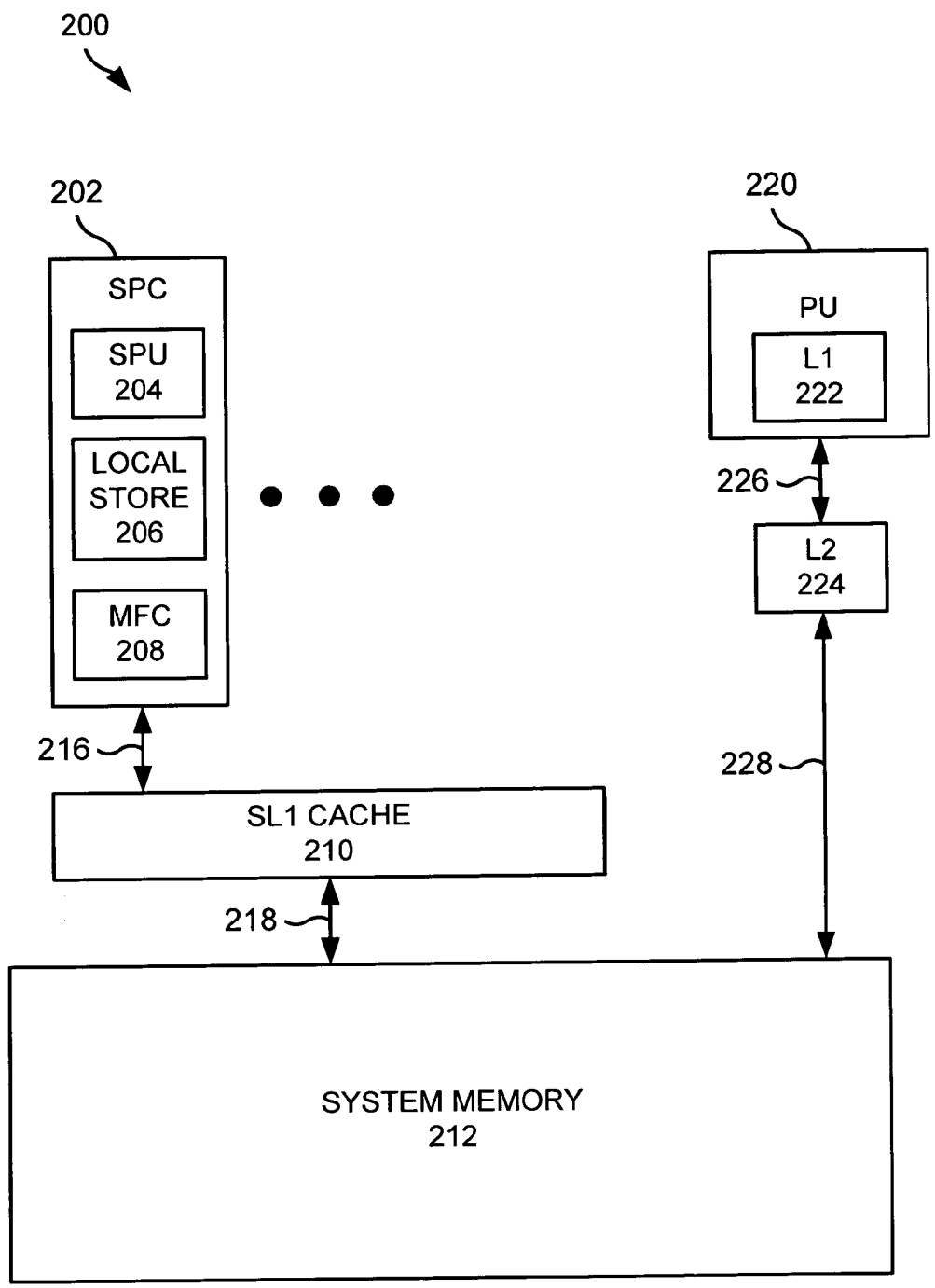
FIG. 2 shows a block diagram illustrating a multiprocessor computer system adopting a cache along with a DMA mechanism.

FIG. 2 is a block diagram illustrating a multiprocessor computer system 200 adopting a cache in a DMA mechanism. The multiprocessor computer system 200 has one or more synergistic processor complexes (SPCs) 202. The SPC 202 has a synergistic processor unit (SPU) 204, a local store 206, and a memory flow controller (MFC) 208. The multiprocessor computer system 200 further comprises an SPU's L1 cache (SL1 cache) 210 and a system memory 212. The SL1 cache 210 is coupled between the SPC 202 and the system memory 212 via connections 216 and 218. Note here that the single SL1 cache 210 is used to interface with all the SPCs 202. In different implementations, however, a plurality of caches may be used. Additionally, the multiprocessor computer system 200 comprises a processing unit (PU) 220, which includes an L1 cache 222. The multiprocessor computer system 200 further comprises an L2 cache 224 coupled between the PU 220 and the system memory 212 via connections 226 and 228.

Once the MFC 208 performs data transfers between the system memory 212 and the local store 206, the transferred data is also fetched to the SL1 cache 210. When the MFC 208 requests the same data later on, the MFC 208 does not have to go all the way back to the system memory 212 to retrieve the data. Instead, the MFC 208 accesses the SL1 cache 210 to retrieve the data and transfer the data to the local store 206. Typically, the size of data being transferred should not exceed the size of the SL1 cache 210.

Preferably, the MFC 208 checks the SL1 cache 210 first for any data. If there is a hit, the MFC 208 transfers the data from the SL1 cache 210 to the local store 206. If there is a miss, the MFC 208 transfers the data from the system memory 212 to the local store 206 as the MFC 208 would normally do.

Figure 3:
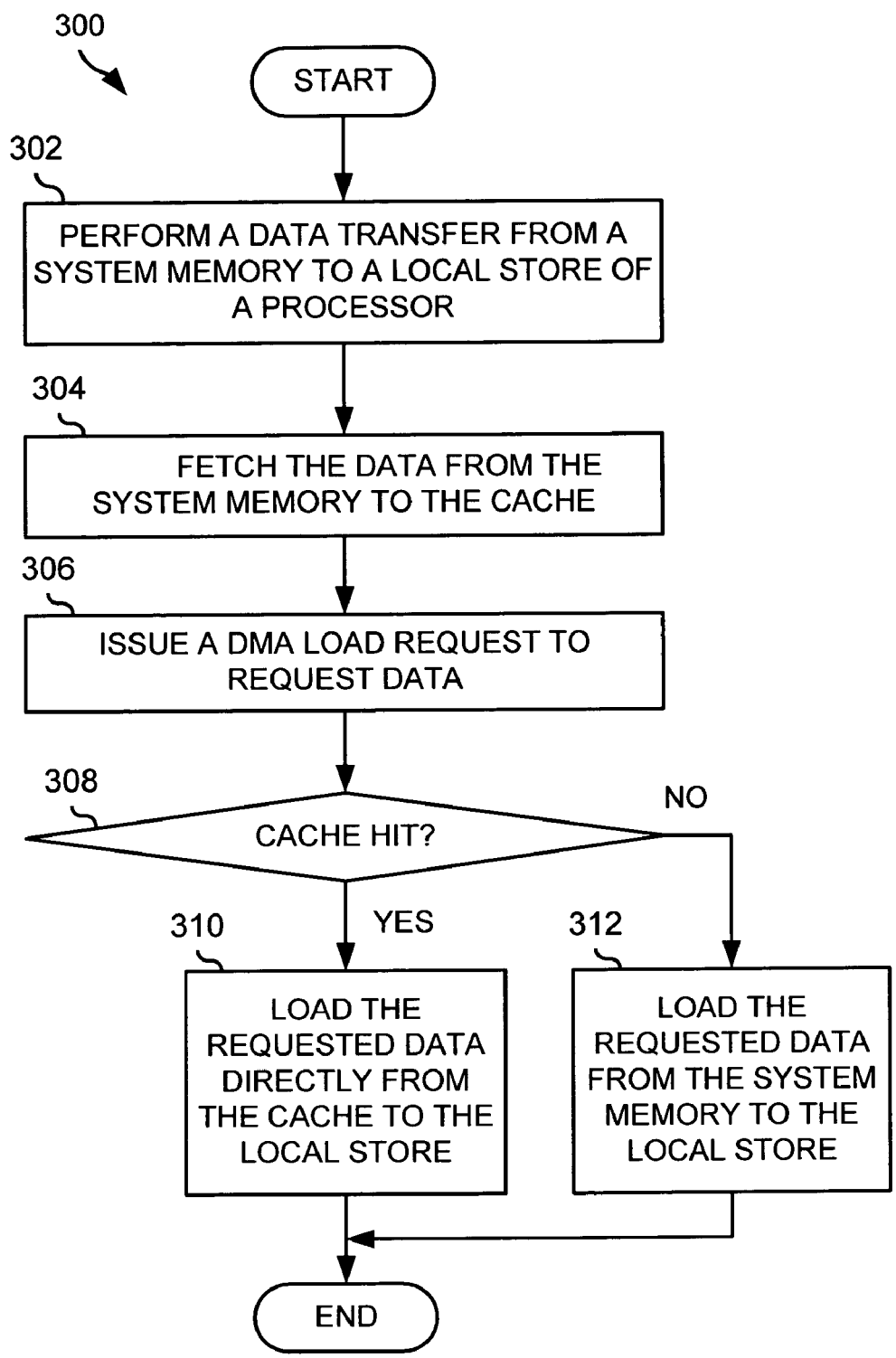
FIG. 3 shows a flow diagram illustrating a caching mechanism applicable to a DMA mechanism as shown in FIGS. 1 and 2.

Now referring to FIG. 3, shown is a flow diagram illustrating a caching mechanism 300 applicable to a DMA mechanism as shown in FIGS. 1 and 2.

In step 302, the DMA mechanism performs a data transfer from a system memory to a local store of a processor. In FIG. 1, for example, the MFC 108 performs a data transfer from the system memory 110 to the local store 106 for the SPC 102. In FIG. 2, for example, the MFC 208 performs a data transfer from the system memory 212 to the local store 206 for the SPC 202. In step 304, the data is fetched from the system memory to the cache. In step 306, a DMA load request is issued to request data from the system memory. In step 308, it is determined whether the requested data is found in the cache. If the requested data is found in the cache in step 308 (i.e. a cache hit), the process goes to step 310, where the requested data is loaded directly from the cache to the local store. If the requested data is not found in the cache in step 308 (i.e., a cache miss), the process continues to step 312, where the requested data is loaded from the memory to the local store.

Note that there may be many different ways to write data back to the system memory without departing from the true spirit of the present invention. For example, the data may be written back to the system memory (e.g., the system memory 110 of FIG. 1) via the cache (e.g., the SL1 cache 109 of FIG. 1). Alternatively, the data may be directly written back to the system memory without going through the cache. In the latter case, the cache entry for the data being written back to the system memory may be invalidated. These and other details on the process of writing data back to the system memory are not further disclosed herein.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for loading data to a local store of a processor in a computer system having a direct memory access mechanism, the method comprising the steps of:
   performing a transfer of a given data element from a system memory of the computer system to the local store;
   determining whether the size of the given data element being transferred from the system memory to the local store is larger than the size of the cache;
   upon a determination that the size of the given data element is not larger than the size of the cache, fetching the given data element from the system memory to a cache of the processor;
   upon a determination that the size of the given data element is larger than the size of the cache, stopping the step of fetching the given data element from the system memory to a cache of the processor;
   issuing a DMA load request to request a requested data element;
   determining whether the requested data element is found in the cache; and
   upon a determination that the requested data element is found in the cache, loading the requested data element directly from the cache to the local store.

2. The method of claim 1, further comprising the step of, upon a determination that the requested data element is not found in the cache, loading the requested data element from the system memory to the local store.

3. The method of claim 1, wherein the computer system includes a plurality of processors sharing the cache, further comprising the step of loading the data from the cache to one or more of the plurality of processors.

4. A computer system comprising:
   a synergistic processor complex comprising:
      a synergistic processor unit;
      a local store; and
      a memory flow controller that acts as a direct memory access controller;
   a system memory; and
   a cache coupled between the synergistic processor complex and the system memory;
   wherein, responsive to a direct memory access request to load a data element from the system memory to the local store, the memory flow controller determines whether the data element is stored in the cache;
   wherein, upon a determination that the data element is stored in the cache, the memory flow controller loads the data element directly from the cache to the local store in the synergistic processor complex; and
   wherein the memory flow controller of the synergistic processor complex determines whether a size of a given data element being transferred from the system memory to a local store is larger than the size of the cache;
   wherein upon a determination that the size of the given data element is not larger than the size of the cache, the memory flow controller fetches the given data element from the system memory to the cache; and
   wherein upon a determination that the size of the given data element is larger than the size of the cache, the memory flow controller stops fetching of the given data element from the system memory to the cache.

5. A multiprocessor computer system comprising:
   a plurality of synergistic processor complexes, wherein each synergistic processor complex within the plurality of synergistic processor complexes comprises:
      a synergistic processor unit;
      a local store; and
      a memory flow controller that acts as a direct memory access controller;
   a system memory; and
   a cache coupled between the plurality of synergistic processor complexes and the system memory,
   wherein responsive to a direct memory access request to load a first data element from the system memory to a first local store of a first synergistic processor complex within the plurality of synergistic processor complexes, a first memory flow controller of the first synergistic processor complex determines whether the first data element is stored in the cache;
   wherein, upon a determination that the first data element is stored in the cache, the first memory flow controller loads the first data element directly from the cache to the first local store of the first synergistic processor complex;

wherein responsive to a direct memory access load request for a second data element at a second memory flow controller of a second synergistic processor complex, determining whether the second data element is stored in the cache;

wherein, upon a determination that the second data element is stored in the cache, the second memory flow controller loads the second data element directly from the cache to the local store of the second synergistic processor complex;

wherein responsive to a direct memory access write request for a third data element at the first memory flow controller of the first synergistic processor complex, the first memory flow controller stores the third data element in the system memory and invalidates a cache entry for the third data element.

6. The multiprocessor computer system of claim 5, wherein responsive to a direct memory access write request for a fourth data element at the first memory flow controller of the first synergistic processor complex, the first memory flow controller stores the fourth data element in the cache and stores the fourth data item in the system memory.

7. A method, comprising:

performing, at a memory flow controller of a fist synergistic processor complex, a direct memory access load of a first data item from a system memory to a local store of the first synergistic processor complex, wherein the first data element is fetched from the system memory, stored in a cache, and loaded into the local store of the first synergistic processor complex; and responsive to a direct memory access load request for a second data element at a memory flow controller of a second synergistic processor complex, determining whether the second data element is stored in the cache and, upon a determination that the second data element is stored in the cache, loading the second data item directly from the cache to the local store of the second synergistic processor complex; and responsive to a direct memory access write request for a third data element at the first memory flow controller of the first synergistic processor complex, storing the third data element in the system memory and invalidating a cache entry for the third data element.

8. The method of claim 7, further comprising:

responsive to a direct memory access write request for a fourth data element at the memory flow controller of the first synergistic processor complex, storing the fourth data element in the cache and storing the fourth data element in the system memory.

* * * * *